Aug. 24, 1965  S. GIERTZ-HEDSTROM  3,202,402
ROTARY VIBRATOR
Filed April 18, 1963
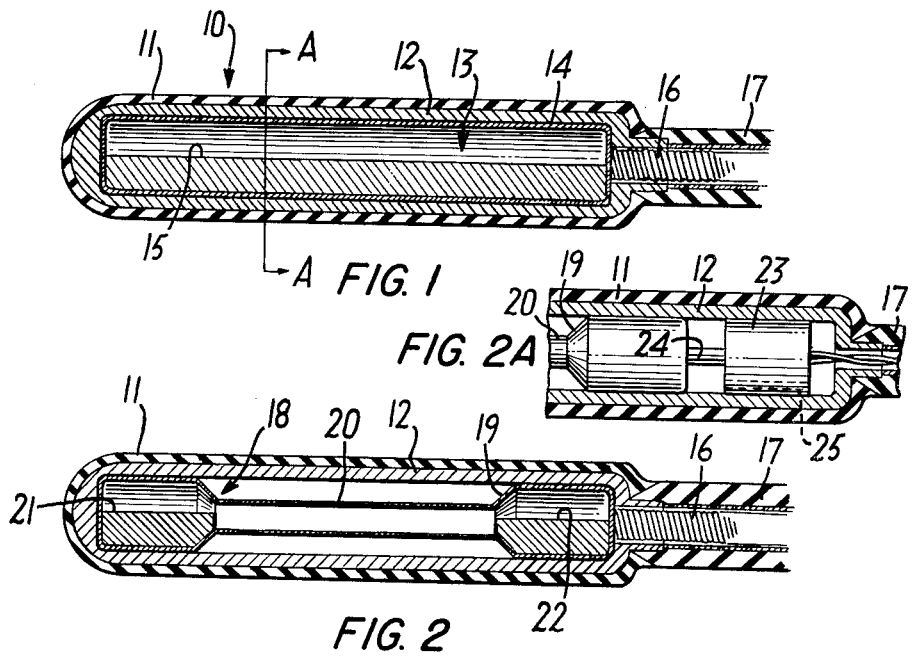
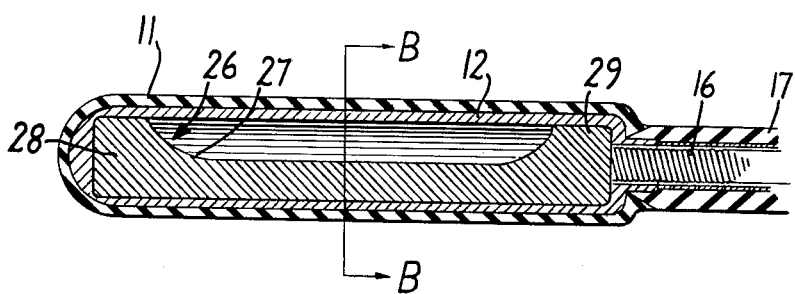
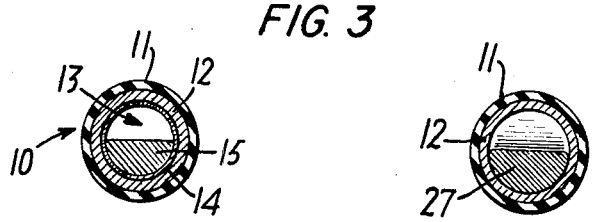
INVENTOR.
STIG GIERTZ-HEDSTRÖM
BY
Brumbaugh, Free, Graves + Donohue
his ATTORNEYS United States Patent Office 3,202,402
Patented Aug. 24, 1965

3,202,402
ROTARY VIBRATOR
Stig Giertz-Hedstrom, Kolhammars Gard, Knivsta, Sweden, assignor to Aktiebolaget Vibro-Verken, Solna, Sweden, a corporation of Sweden
Filed Apr. 18, 1963, Ser. No. 273,992
Claims priority, application Sweden, Apr. 25, 1962, 4,614/62
2 Claims. (Cl. 259—1)

This invention relates to rotary vibrators and, in particular, to vibrators intended to be immersed at least partially in semi-fluid or viscous material to be vibrated, such as concrete.

Rotary immersion vibrators, sometimes known as spade, poker or internal vibrators, are often constructed in the form of a tube, closed at one end, that contains a rotatable member. A motor drives the rotatable member through a flexible shaft, or in some instances the motor is integral with the tube.

One class of rotary immersion vibrators is formed by a pendulum shaft journaled at one end in a bearing that permits free rotation. The other end of the pendulum shaft describes a planetary motion around a roller race at the closed end of the tube. In another arrangement, the rotating member consists of an eccentric shaft journaled in two bearings in the tube. When rotated, the eccentric shaft generates vibrations which are transmitted to the tube through the shaft bearings.

In both of the foregoing types of rotary vibrators, the rotating member is journaled inside the vibrator casing by one or more bearings. Operation of the vibrators results in great stresses and wear on the bearings, which shortens the useful life of the vibrators. Moreover, such bearings add considerably to the cost of manufacturing the vibrators. With pendulum vibrators, it is also difficult to obtain a satisfactory seal at the pendulum shaft bearing.

The prior vibrators require strong, relatively heavy casings. The mass of those casings, which must be vibrated by the rotating member, results in considerable damping of the vibrations and reduces greatly the vibrations transmitted to the particular mix in which the vibrators are immersed.

The present invention overcomes the above difficulties previously associated with rotary immersion vibrators by providing an unbalanced rotating member in sliding contact with the interior of the vibrator casing. With this arrangement, conventional bearings, together with all parts required for mounting such bearings, are eliminated, and this permits a substantial reduction in the total mass of the vibrator casing. Since the rotating member is in sliding contact with the interior of the casing, in one embodiment throughout its entire length and in another embodiment throughout a portion of its length, the casing will be strengthened by the rotatable member and subjected to only slight bending stresses. The casing can thus be made much simpler and lighter to reduce its mass and the resultant damping effect on vibrations generated. The rotating member can also be of simple design since a supporting shaft between bearing points is not required, thus further reducing the mass of damping material in the vibrator.

These and further advantages of the invention will be more readily understood when the following description is read in conjunction with the accompanying drawings, in which:

FIGURE 1 is a longitudinal section of a rotary vibrator incorporating the principles of the present invention;

FIGURE 2 is a longitudinal section of another vibrator constructed pursuant to the present invention;

FIGURE 2A is a partial section of a vibrator similar to that of FIGURE 2 but with a modified drive arrangement;

FIGURE 3 is a longitudinal section of still another embodiment of the present invention;

FIGURE 4 is a transverse section of the vibrator of FIGURE 1 taken along the view line A—A looking in the direction of the arrows; and FIGURE 5 is a longitudinal section of FIGURE 3 taken along the view line B—B looking in the direction of the arrows.

Referring to a typical embodiment of the invention with particular reference to FIGURE 1, an elongated casing 10 comprises an outer shell 11 and a tube 12 inside of the shell to provide a surface of revolution. A rotatable member 13, formed by a hollow tube 14 half-filled with an unbalancing material 15 such, for example, as solder or lead, is formed with an exterior surface forming a surface of revolution in sliding contact and coaxial with the interior surface of the casing 10.

A flexible drive shaft 16, joined in a suitable fashion to the member 13, rotates freely in a flexible tube 17 in direct communication with the interior of the casing 10. With this arrangement, lubricant introduced into the tube 17 for the flexible shaft 16 also is fed into the interior of the casing 10 to lubricate the sliding contact between the tube 12 and rotating member 13.

Referring to FIGURE 4, the weighting material 15 which half-fills the tube 14 provides an unbalanced rotating member 13, as clearly shown. With the center of gravity of the member 13 eccentrically located with respect to its rotational axis, rotation of the member will generate sine wave vibrations which directly correspond to its speed of rotation.

The rotary vibrator of FIGURE 1 is formed with an outer shell 11 which is an extension of the flexible tube 17. When a normally elastic rubber is used for the tube 17, the same rubber may be used for the shell 11 of the vibrator due to the rigidity provided through use of the rotatable member 13 in contact with the casing 10. If desired, the entire vibrator casing 10 may be formed of rubber, in which event the interior sliding surface will be formed by rubber. Suitable lubricants are used between the member 13 and the interior rubber surface of the casing 10, and the resulting vibrator operates most efficiently to transmit vibrations to plastic materials in which the unit is immersed.

Referring to FIGURE 2, in which elements similar to those in FIGURE 1 have been designated by like reference numerals, a rotatable member 18 is formed by an elongated tube 19 provided with a reduced diameter central section 20. Weighting material 21 and 22 half-fills the end portions of the tube 19 to provide an unbalanced member. With this arrangement, there is less friction between the rotating member 18 and the interior of the casing 10, and yet the contact between the two elements is sufficient to afford the vibrator casing the necessary amount of rigdity.

In FIGURE 2A a modified drive arrangement for the vibrator of FIGURE 2 includes a drive motor 23 secured in the end of the casing 10 to rotate the member 18 through a coupling 24. A passage 25 is provided for lubricating the sliding surfaces in the vibrator.

Referring to FIGURES 3 and 5, in which elements similar to those in FIGURE 1 have been designated by the same reference numerals, a rotatable member 26 is formed by a solid rod from which a central section 27 has been removed to provide an unbalanced member. The end portions 28 and 29, and the portion opposite the cutaway section, have their exterior surfaces in sliding contact with the interior surface of the casing 10.

If desirable, the rotatable members 13, 18 or 26 may be coupled directly to a drive motor through a rigid shaft or coupling arrangement, such as shown in FIGURE 2A, and the flexible shaft 16 eliminated, because the rotating members have no pendulum motion. With that arrangement, the drive motor may be incorporated in the vibrator casing, as shown, or attached to one end of the casing.

The operation of the embodiments of the invention shown in FIGURES 1 to 5 is evident from the above description. Thus, rotation of the members 13, 18 or 26 within the vibrator casings 10 will result in the generation of sine wave vibrations directly corresponding to the speed of rotation. The relatively light construction of the vibrator casings results in very little damping of the vibrations, which will, therefore, be transmitted efficiently to any semi-fluid, viscous or plastic mass in which the vibrator is immersed.

It will be understood that the above-described embodiments of the invention are illustrative only, and modifications thereof will occur to those skilled in the art. Therefore, the invention is not to be limited to the specific apparatus disclosed herein but is to be defined by the appended claims.

I claim:

1. A rotary vibrator comprising an elongated casing, a surface of revolution on the interior of the casing, an elongated member in the casing formed by two sections joined by a reduced size section, a surface of revolution on each of the two sections coaxial with the casing surface and in sliding contact therewith, means unbalancing the elongated member with respect to the axis of the sliding surfaces, a flexible shaft to rotate the member attached thereto, and a tube containing the flexible shaft integral with and extending from the casing with the interior of the tube and casing in direct communication.

2. A rotary vibrator as defined in claim 1, in which the elongated member is formed by a tube which forms the two sections which are joined by a reduced diameter central section, and the two tube sections are partially filled with a weighting material to unbalance the member about its longitudinal axis.

References Cited by the Examiner
UNITED STATES PATENTS

| | | | |
|---|---|---|---|
| 739,083 | 9/03 | Hyatt | 128—35 |
| 2,073,393 | 3/37 | Mall. | |
| 2,662,750 | 12/53 | Degen. | |

WALTER A. SCHEEL, *Primary Examiner.*